(12) United States Patent
Nakaya et al.

(10) Patent No.: US 10,738,909 B2
(45) Date of Patent: Aug. 11, 2020

(54) FUEL TANK VALVE

(71) Applicants: Yachiyo Industry Co., Ltd., Sayama-shi, Saitama-ken (JP); Toyoda Gosei Co., Ltd., Kiyosu-shi, Aichi-ken (JP)

(72) Inventors: Kazunari Nakaya, Sakura (JP); Toshinori Seki, Kiyosu (JP); Kenichiro Kaneko, Kiyosu (JP)

(73) Assignees: YACHIYO INDUSTRY CO., LTD., Sayama-Shi (JP); TOYODA GOSEI CO., LTD., Kiyosu-Shi (JP)

( * ) Notice: Subject to any disclaimer, the term of this patent is extended or adjusted under 35 U.S.C. 154(b) by 220 days.

(21) Appl. No.: 14/225,980

(22) Filed: Mar. 26, 2014

(65) Prior Publication Data
US 2014/0209190 A1 Jul. 31, 2014

(30) Foreign Application Priority Data
Jan. 30, 2013 (JP) .................................. 2013-015673

(51) Int. Cl.
 *F16K 24/04* (2006.01)
 *F16K 31/22* (2006.01)
 *F02M 25/08* (2006.01)

(52) U.S. Cl.
 CPC ......... *F16K 31/22* (2013.01); *F02M 25/0836* (2013.01); *F16K 24/044* (2013.01); *Y10T 137/3099* (2015.04); *Y10T 137/7423* (2015.04)

(58) Field of Classification Search
 CPC ........ F16K 31/22; F16K 24/044; F16K 24/02; F16K 31/20; B60K 15/04; B60K 15/035; F02M 25/0836; F02M 37/0082; Y10T 137/7423; Y10T 137/0874; Y10T 137/3099; Y10T 137/053; Y10T 137/0753; Y10T 137/0777; Y10T 137/6004; Y10T 137/7358; Y10T 137/86324; Y10T 137/86332
(Continued)

(56) References Cited

U.S. PATENT DOCUMENTS 1,161,877 A * 11/1915 Nelson .................. F24D 19/081
  137/202
4,694,847 A *  9/1987 Szlaga ............. B60K 15/03519
  137/39

(Continued)

FOREIGN PATENT DOCUMENTS

JP         7-293384         11/1995

OTHER PUBLICATIONS

Japanese Office Action dated Jun. 23, 2015 with partial English translation, 3 pages.

*Primary Examiner* — Craig J Price
(74) *Attorney, Agent, or Firm* — Rankin, Hill & Clark LLP

(57) ABSTRACT

A fuel tank valve having: a housing that is arranged in a fuel tank and has a communication port communicating with an outside of the fuel tank; and a float valve body that is installed in the housing and closes the communication port when fuel in the housing increases, where a wall part of the housing has an opening part through which the fuel flows in and out, and a projecting part that is formed to correspond to the opening part and projects outwardly from the wall part, and the projecting part is separated above from the opening part by a predetermined distance, is provided.

4 Claims, 4 Drawing Sheets

(58) Field of Classification Search
USPC ..... 137/43, 202, 15.26, 38, 39, 315.08, 409, 137/423, 429, 587, 588
See application file for complete search history.

(56) References Cited

U.S. PATENT DOCUMENTS

| | | | | |
|---|---|---|---|---|
| 5,156,178 | A * | 10/1992 | Harris | B60K 15/03519 123/516 |
| 5,234,022 | A * | 8/1993 | Harris | B60K 15/03519 137/43 |
| 5,261,439 | A * | 11/1993 | Harris | B60K 15/03519 123/516 |
| 5,313,978 | A * | 5/1994 | Takaki | B60K 15/03519 123/514 |
| 5,449,018 | A * | 9/1995 | Harris | B60K 15/03519 137/43 |
| 5,529,086 | A * | 6/1996 | Kasugai | B60K 15/03519 137/202 |
| 5,577,526 | A * | 11/1996 | Kasugai | B60K 15/03519 137/202 |
| 5,590,697 | A * | 1/1997 | Benjey | B60K 15/03519 137/202 |
| 5,598,870 | A * | 2/1997 | Nagino | B60K 15/03519 123/518 |
| 6,240,950 | B1 * | 6/2001 | Harris | B60K 15/03519 137/202 |
| 6,286,539 | B1 * | 9/2001 | Nishi | B60K 15/03519 137/202 |
| 6,371,152 | B1 * | 4/2002 | Benjey | B60K 15/03519 137/202 |
| 6,412,511 | B1 * | 7/2002 | Rosseel | B60K 15/03504 137/202 |
| 6,591,855 | B2 * | 7/2003 | Nishi | B60K 15/03519 137/202 |
| 6,675,779 | B2 * | 1/2004 | King | F02M 37/20 123/518 |
| 6,918,405 | B2 * | 7/2005 | Leonhardt | B60K 15/03519 137/202 |
| 7,147,017 | B2 * | 12/2006 | Leonhardt | F16K 24/044 141/198 |
| 7,168,441 | B2 * | 1/2007 | Miyoshi | B60K 15/03519 137/202 |
| 7,188,613 | B2 * | 3/2007 | Miura | F16K 24/044 123/198 D |
| 7,273,042 | B2 * | 9/2007 | Kito | B60K 15/03519 123/516 |
| 7,418,975 | B2 * | 9/2008 | Nojiri | F16K 24/044 137/202 |
| 7,448,364 | B2 * | 11/2008 | Kaneko | F02M 25/0836 123/198 DB |
| 7,527,064 | B2 * | 5/2009 | Kito | F16K 1/36 137/202 |
| 7,571,740 | B2 * | 8/2009 | Kaneko | F16K 24/044 137/202 |
| 8,141,576 | B2 * | 3/2012 | Matsuo | F16K 31/22 137/202 |
| 8,550,107 | B2 * | 10/2013 | Roscher | B60K 15/03504 137/202 |
| 8,678,218 | B2 * | 3/2014 | Roscher | B60K 15/03519 137/202 |
| 8,720,471 | B2 * | 5/2014 | Yasuda | F16K 24/044 137/202 |
| 8,770,218 | B2 * | 7/2014 | Tagami | F16K 31/18 137/202 |
| 9,333,851 | B2 * | 5/2016 | Miura | B60K 15/03519 |
| 2004/0003843 | A1 * | 1/2004 | Sugiyama | F16K 24/044 137/202 |
| 2004/0238033 | A1 * | 12/2004 | Miyoshi | B60K 15/03519 137/202 |
| 2007/0295312 | A1 | 12/2007 | Kaneko et al. | |
| 2009/0084449 | A1 * | 4/2009 | Matsuo | F16K 24/044 137/409 |
| 2009/0236350 | A1 * | 9/2009 | Miura | B60K 15/03504 220/745 |
| 2011/0088662 | A1 * | 4/2011 | Erdmann | F16K 24/04 123/518 |
| 2011/0186149 | A1 * | 8/2011 | Tagami | F16K 31/18 137/409 |
| 2011/0315241 | A1 * | 12/2011 | Yasuda | F16K 24/044 137/409 |
| 2013/0233852 | A1 * | 9/2013 | Mihara | F02M 37/0023 220/86.2 |
| 2013/0312841 | A1 * | 11/2013 | Vulkan | F16K 24/042 137/43 |

* cited by examiner

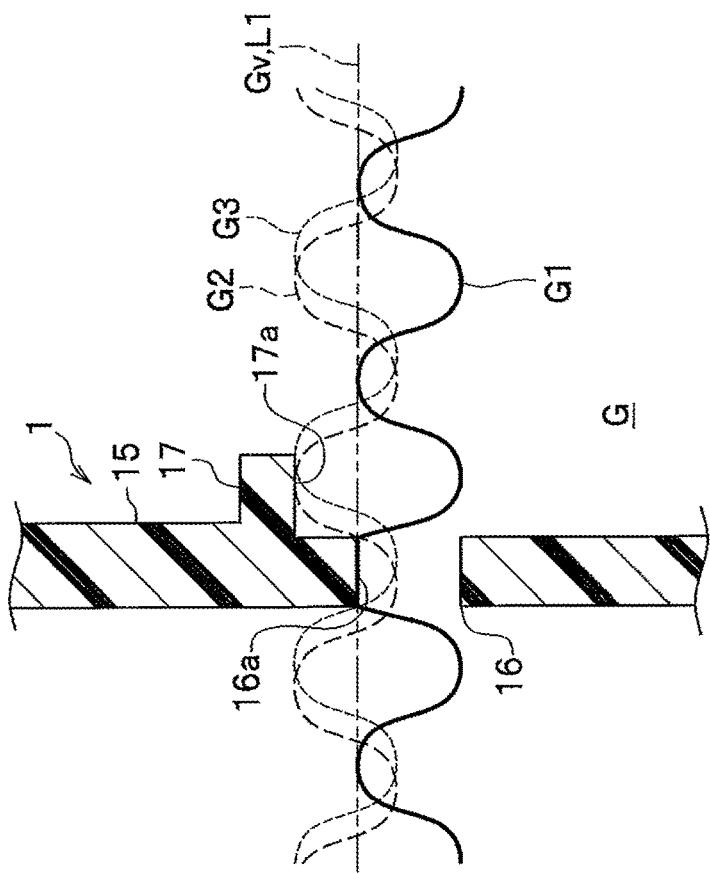
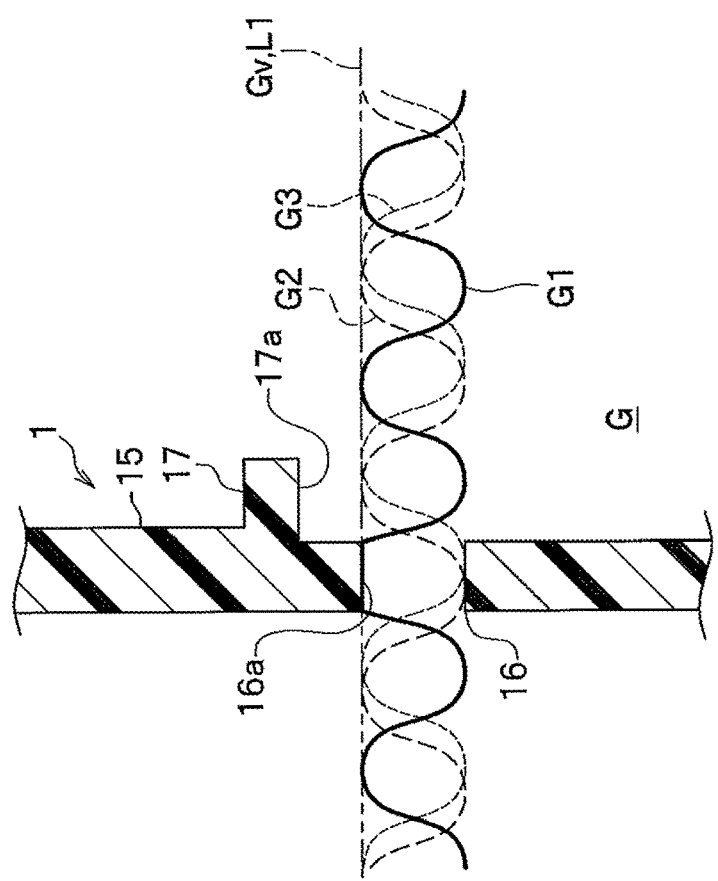

FUEL TANK VALVE

CROSS REFERENCE TO RELATED APPLICATION

The present application claims benefit of the filing date of Japanese Patent Application No. 2013-015673 filed on Jan. 30, 2013, the disclosure of which is incorporated herein by reference.

BACKGROUND OF THE INVENTION

1. Field of the Invention

The invention relates to a fuel tank valve.

2. Description of the Related Art

For example, JP4609384 B2 discloses a fuel tank valve having a float valve body. The fuel tank valve has a housing which has a communication port which communicates with a canister, a float valve body which moves up and down in the housing, and a coil spring which assists upward movement of the float valve body. On a wall section constituting the housing, an opening part through which fuel flows in and out and a projecting part which is formed to correspond to the opening part and projects outwardly from the wall section. A lower surface of the projecting part is flush with an upper surface of a hole wall in the opening part.

The fuel tank valve generates differential pressure between the housing and a fuel tank by blocking the opening part by fuel fed in the fuel tank. Thus, the fuel flows from the opening part into the housing, the float valve body moves upward, and the communication port formed in the housing is closed. The upper surface of the hole wall in the opening part and the lower surface of the projecting part function as detection surface with which fuel level is detected.

A traditional fuel tank valve has a large contact area between the detection surface and the fuel by providing the projecting part. Thus, since the fuel tends to attach on the detection surface by surface tension, the opening part is closed without delay. Therefore, air involvement in the housing and float reduction of the float valve body can be prevented. Further, detectivity can be stabilized by making the contact area between the detection surface and the fuel larger by providing the projecting part.

SUMMARY OF THE INVENTION

In the traditional fuel tank valve above, the detection surface constituted by the upper surface of the hole wall in the opening part and the lower surface of the projecting part is used to detect whether the fuel is full or not. Shortly, when the fuel is stored and liquid surface of the fuel is flat, the detection surface and the liquid surface of the fuel preferably coincide or are close as possible.

However, in a middle of storing the fuel, if a fluctuating liquid surface approaches the detection surface, the liquid surface of the fuel upsurges by the surface tension with the detection surface. Therefore, the opening part is closed before an average liquid level of the fluctuating fuel reaches the detection surface. In other words, in the traditional fuel tank valve above, the surface tension acts on a wide area due to the added projecting part regardless that the average liquid level of the fluctuating fuel positions below the detection surface. Therefore, a problem rises such that fuel flows from the opening part into the housing and the communication port of the housing is closed by the float valve body. In the traditional fuel tank valve above, though the detectivity can be stabilized, a preset full setting point does not correspond to a liquid level of the stored fuel.

The invention is made in light of solving such problems and an object of the invention is to provide a fuel tank valve which can stabilize detectivity and can make a liquid level of a stored fuel correspond to a preset full setting point.

In order to resolve the above problem, an aspect of the invention provides a fuel tank valve having: a housing that is arranged in a fuel tank and has a communication port communicating with an outside of the fuel tank; and a float valve body that is installed in the housing and closes the communication port when fuel in the housing increases, where a wall part of the housing has an opening part through which the fuel flows in and out, and a projecting part that is formed to correspond to the opening part and projects outwardly from the wall part, and the projecting part is separated above from the opening part by a predetermined distance.

According to the structure, since the projecting part is provided, a contact area between the opening part and vicinity thereof and the fuel can be larger. Thus, detectivity can be stabilized. Further, since the projecting part is separated above from the opening part by a predetermined distance, a portion of the detection surface is set higher than the traditional art. Thus, a liquid level of the stored fuel can corresponds to a preset full setting point.

Further, the fuel tank valve is installed in a position near a fuel feeding port formed in a side wall part of the fuel tank on a ceiling wall part of the fuel tank. According to the structure, the detectivity can be stabilized at a position near the fuel feeding port where a liquid surface of the fuel tends to ripple. Also, the liquid level of the stored fuel can correspond to the preset full setting point.

According to the fuel tank valve according to the invention, the detectivity can be stabilized, and the liquid level of the stored fuel can correspond to the preset full setting point.

BRIEF DESCRIPTION OF THE DRAWINGS

FIG. 4A is a schematic sectional side view around an opening part before being closed for explaining an operation of the fuel tank valve according to the embodiment; and FIG. 4B is a schematic sectional side view around the opening part after being closed for explaining the operation of the fuel tank valve according to the embodiment.

DETAILED DESCRIPTION OF THE PREFERRED EMBODIMENTS

Figure 1:
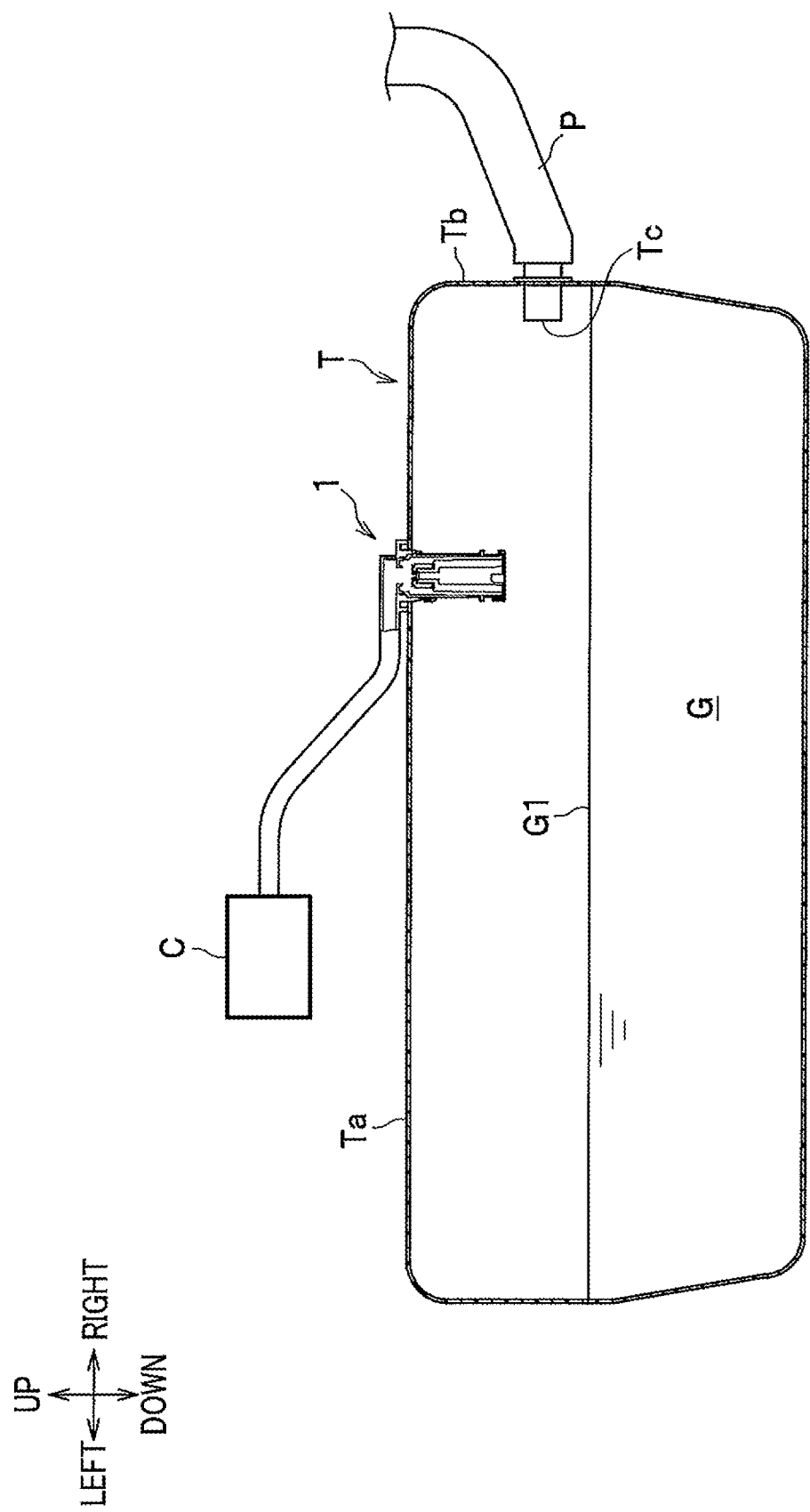
FIG. 1 is a whole sectional side view of a fuel tank valve and a fuel tank according to an embodiment of the invention.

An embodiment of the invention will be explained with reference to accompanying drawings. As illustrated in FIG. 1, a fuel tank valve 1 according to the embodiment is installed in a fuel tank T which stores fuel G. Though the fuel tank valve 1 may be used such as fuel full detection valve and cut valve, the fuel tank valve 1 as fuel full detection valve will be exemplified in the embodiment. In the explanations below, an "up-down" direction and a "right-left" direction correspond to arrows in FIG. 1.

The fuel tank T is a plastic hollow container and stores fuel G therein. The fuel tank valve 1 is installed in a ceiling wall section Ta of the fuel tank T. A fuel feeding pipe P is connected to a side wall section Tb of the fuel tank T. The fuel G flowing through the fuel feeding pipe P is fed in the fuel tank T via a fuel feeding port Tc formed in the side wall section Tb.

Figure 2:
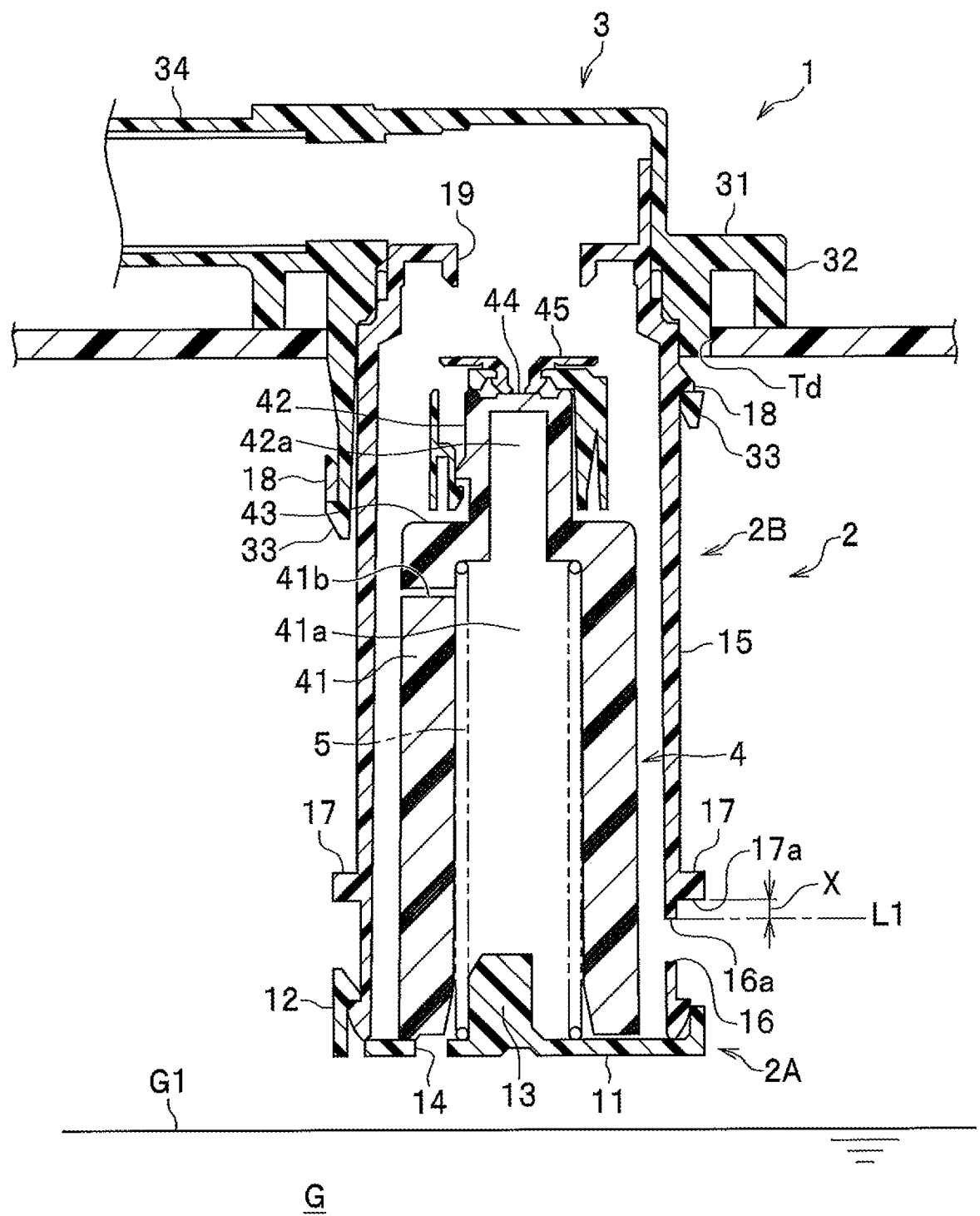
FIG. 2 is a sectional side view of the fuel tank valve according to the embodiment.

As illustrated in FIG. 2, the fuel tank valve 1 has a housing 2, a connection port member 3, a float valve body 4 and a biasing member 5.

The housing 2 is a case in which the float valve body 4 is accommodated. The housing 2 is inserted through an opening Td of the fuel tank T and is attached on the connection port member 3. The housing 2 is formed by a housing bottom section 2A and a housing main body 2B.

The housing bottom section 2A has a bottom part 11, an outer wall part 12 and a positioning part 13. The bottom part 11 constitutes a bottom of the housing bottom section 2A and has a disk shape. A through aperture 14 which penetrates in the up-down direction is formed in the bottom part 11. The number, size and shape of the through aperture 14 is not especially limited.

The outer wall part 12 has a cylindrical shape and is vertically arranged on an outer edge of the bottom part 11. The positioning part 13 has a column shape and is vertically arranged on the bottom part 11. The positioning part 13 is configured to position a base end side of the biasing part 5.

The housing main body 2B mainly has a wall part 15, an opening part 16, a projecting part 17, an engaging part 18 and a communication port 19. The housing main body 2B is an integrally formed plastic member. The housing bottom section 2A is attached on a lower end of the housing main body 2B.

The wall part 15 has an approximately cylindrical shape. The opening part 16 is form in a lower side of the wall part 15. The opening part 16 has a rectangular shape seen from a side and extends in a circumferential direction. In the embodiment, four opening parts 16 are formed in the circumferential direction at regular intervals. The number, size and shape of the opening part 16 may be appropriately set based on a height position of the projecting part 17, an up-down timing of the float valve body 4 or the like.

A position of an upper surface 16a of a hole wall in the opening part 16 is set as a "full setting point L1" in the embodiment. Shortly, when a predetermined time frame passes since the fuel G is fed and a liquid surface G1 of the fuel G remains in a standstill, the full setting point L1 is set to correspond to the liquid surface G1 of the fuel G.

The projecting part 17 projects outwardly from the wall part 15 in a substantially perpendicular manner, in the whole circumferential direction. A cross-sectional shape of the projecting part 17 is a rectangle. A lower surface 17a of the projecting part 17 is apart above from the upper surface 16a of the hole wall in the opening part 16 at a distance of X. The projecting part 17 is provided in the whole circumferential direction, but may be provided at least a position corresponding to the opening part 16.

In the embodiment, a "detection surface" is formed by the upper surface 16a of the hole wall in the opening part 16 and the lower surface 17a of the projecting part 17. Shortly, the opening part 16 is closed by the fuel G in the fuel tank T which is attached to the upper surface 16a and the lower surface 17a, and thereby the float valve body 4 moves upward.

The engaging part 18 is configured to engage with an engaged part 33 of the connection port member 3. In the embodiment, the engaging part 18 is engaged with the engaged part 33 in a single operation.

The communication port 19 is configured to communicate in the up-down direction at an upper end of the housing main body 2B. The communication port 19 communicates with a canister C.

The connection port member 3 is a plastic member which is attached on an upper part of the housing 2 and is welded on the fuel tank T. Further, the connection port member 3 has a flow passage communicating with the canister C (see FIG. 1). The connection port member 3 mainly has a flange 31, a wall part 32, the engaged part 33 and a connection part 34.

The flange 31 is exposed outside the fuel tank T. The flange 31 has an approximately ring shape. The wall part 32 extends downward from an outer edge of the flange 31. A lower end of the wall part 32 is welded on the fuel tank T.

The engaged part 33 has a notch and is configured to engage with the engaging part 18. The engaged part 33 has an elastically deformable free end at a distal end thereof.

The connection part 34 extends from the center of the flange 31 to a left side and has a cylindrical part which communicates with the communication port 19. The cylindrical part is attached with a tube which communicates with the canister C.

The float valve body 4 is a plastic float member which moves un and down in the housing 2. The float valve body 4 has a large diameter part 41, a small diameter part 42, a stepped part 43, an upper wall 44 and a contact part 45.

The large diameter part 41 has a cylindrical shape. A large diameter hollow part 41a is formed in the large diameter part 41. A vent 41b is formed at an upper side of the large diameter part 41. Air in the large diameter hollow part 41a flows to the canister C via the vent 41b and the communication port 19. The small diameter part 42 is formed on the upper side of the large diameter part 41 and has a cylindrical shape. The small diameter part 42 is formed to have a smaller outer diameter than the large diameter part 41. A small diameter hollow part 42a is formed in the small diameter part 42.

The stepped part 43 is configured to couple the large diameter part 41 with the small diameter part 42. The stepped part 43 makes a right angle with the large diameter part 41 and the small diameter part 42. The upper wall 44 is used for blocking an upper side of the small diameter part 42.

The contact part 45 is formed on an upper surface of the upper wall 44 and configured to closely contact with the communication port 19 when the float valve body 4 moves upward.

The biasing member 5 is configured to assist movement in the un-down direction of the float valve body 4. In the embodiment, the biasing member 5 is formed by a coil spring.

The biasing member 5 is almost as high as the large diameter hollow part 41a. The base end side of the biasing member 5 is fixed on a base end of the positioning part 13 and a distal end side thereof contacts on a stepped portion between the large diameter hollow part 41a and the small diameter hollow part 42a. In the embodiment, the biasing member 5 is formed by the coil spring, but any member may be used if the member assists the movement of the float valve body 4.

Next, an operation of the fuel tank valve 1 according to the embodiment will be explained. In case that the liquid surface G1 of the fuel G stored in the fuel tank T positions below the fuel tank valve 1, the float valve body 4 positions at a bottom. Thus, since the communication port 19 is in a state of ventilation, vapor generated from the fuel G flows to the canister C via the through aperture 14, the vent 41b and the communication port 19. Further, the vapor generated from the fuel G flows to the canister C via the opening part 16 and the communication port 19.

The liquid surface G1 of the fuel G stored in the fuel tank T blocks the opening part 16, the fuel G flows in the housing 2 through the opening part 16 due to differential pressure between an inside of the housing 2 and an inside of the fuel tank T. Thus, the float valve body 4 moves upward and the contact part 45 of the float valve body 4 contacts to close the communication port 19. Accordingly, the fuel G remains in the fuel feeding pipe P (see FIG. 1) and a fuel feeding gun (not illustrated) stops feeding automatically when the fuel G contacts the fuel feeding gun. Thus, according to the fuel tank valve 1, the vapor can be set free from the fuel tank T and an outflow of the fuel G to an outside can be prevented.

Figure 3:
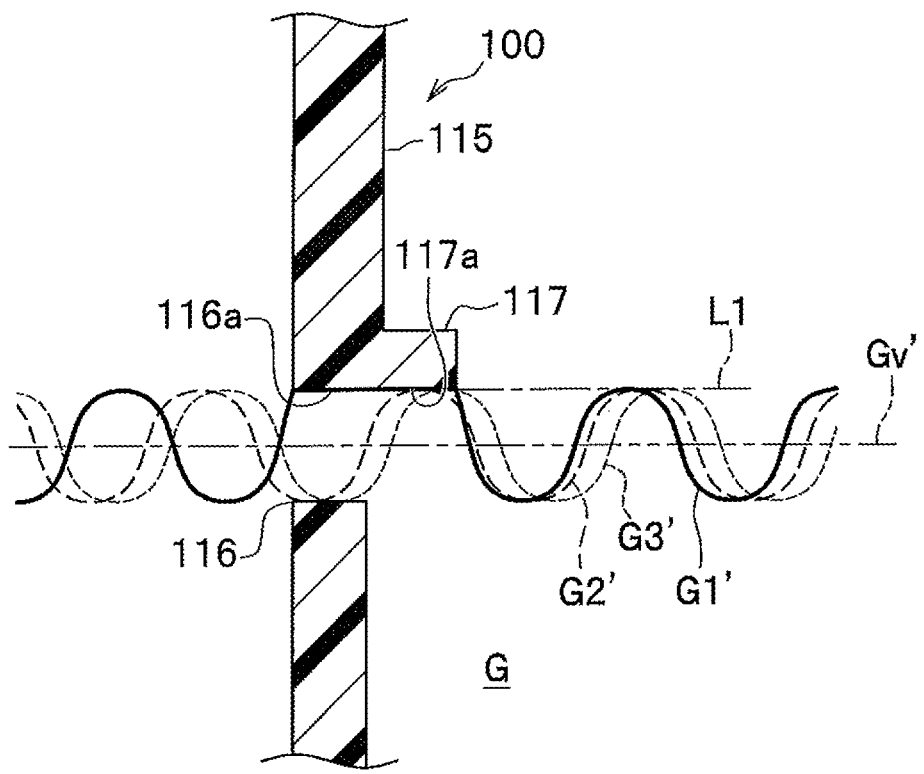
FIG. 3 is a schematic sectional side view around an opening part for explaining an operation of a related fuel tank valve.

Referring to FIGS. 3 to 4B, the operation of the fuel tank valve 1 according to the embodiment will be explained by contrast with an operation of the traditional fuel tank valve 100. FIG. 3 is a schematic sectional side view around the opening part for explaining the operation of the traditional fuel tank valve.

As illustrated in FIG. 3, the traditional fuel tank valve 100 is the same as the fuel tank valve 1 according to the embodiment, except the position of the projecting part 117. An upper surface 116a of a hole wall in an opening part 116 of the fuel tank valve 100 are flush with a lower surface 117a of the projecting part 117. In the traditional fuel tank valve 100, height positions of the upper surface 116a and the lower surface 117a are set as a "full setting point L1".

In the traditional fuel tank valve 100, when the fuel G is fed in the fuel tank T, a liquid surface G1' of the fuel G rises gradually. During the feeding, since the fuel G is fed consecutively, the liquid surface G1' of the fuel G is in a state of fluctuation. Though the liquid surface of the fuel G is hardly to be illustrated precisely because it fluctuates irregularly, the liquid surface includes the liquid surface G1' (solid line), a liquid surface G2' (dotted line) and a liquid surface G3' (dotted line) as waveforms as illustrated in FIG. 3, for convenience of explanation. A sign "Gv'" indicates an "average liquid level" of the liquid surfaces G1', G2' and G3'.

In the traditional fuel tank valve 100, since the projecting part 117 which is flush with the upper surface 116a is provided, a detection surface area becomes bigger. Therefore, a peak of any one of the liquid surfaces G1', G2' and G3' of the fluctuating fuel G contacts the detection surface, the liquid surface of the fuel G attaches on the detection surface by the surface tension. Therefore, the whole opening part 16 in the circumferential direction (the front and back direction in FIG. 3) is blocked promptly before the average liquid level Gv' reaches the detection surface. A portion of the liquid surface G1 depicted in an approximately trapezoidal shape is a swelled portion by the surface tension.

In other words, in the traditional fuel tank valve 100, since the projecting part 117 is provided, the surface tension acts on a wide area. Therefore, the float valve body 4 moves upward to close the communication port 19 regardless that the average liquid level Gv' of the fuel positions below the detection surface. The average liquid level Gv' of the fuel is approximately equal to a position of the liquid surface when the fuel G stops the fluctuation. Thus, the preset full setting point L1 does not correspond to the liquid level (average liquid level Gv') of the stored fuel.

On the other hand, as illustrated in FIG. 4A, the liquid surface G1 according to the embodiment contacts the upper surface 16a of the opening part 16, but an area affected by the surface tension is small. Further, the liquid surfaces G2 and G3 do not contact the upper surface 16a of the opening part 16. Therefore, the liquid surface G1 attaches on a portion of the opening part 16, but does not attach to an extent that the whole opening part 16 is closed in the circumferential direction. Thus, since the communication port 19 is not closed, the liquid level of the fuel G rises more than the related art.

As illustrated in FIG. 4B, when the liquid level of the fuel G rises and the peak of either one of the liquid surfaces G2 and G3 contacts the lower surface 17a, the surface tension acts on the upper surface 16a and the lower surface 17a consecutively and the whole opening part 16 is closed in the circumferential direction. Thus, the fuel G flows from the opening part 16 to the housing 2, and the float valve body 4 rises to close the communication port 19.

Thus, an area affected by the surface tension is small only with the upper surface 16a of the opening part 16, and the detectivity becomes unstable. According to the fuel tank valve 1, since the lower surface 17a of the projecting part 17 contacts the fuel G in addition to the upper surface 16a of the opening part 16, a contact area with the fuel G can be larger. Therefore, the detectivity can be stabilized.

Further, the lower surface 17a of the projecting part 17 constituting a portion of the detection surface is separated above from the upper surface 16a of the hole wall in the opening part 16 by the distance X, so the liquid level of the fuel G when the communication port 19 is closed rises more than the related art. Therefore, the average liquid level Gv of the fuel G can be raised more than the average liquid level Gv' in the related art. Thus, the float valve body 4 can be prevented from moving upward regardless that the average liquid level of the fluctuating fuel G positions below the preset full setting position L1. Further, the liquid level (average liquid level Gv) of the stored fuel G can correspond to the preset full setting point L1.

In other words, in the related fuel tank valve 100, irregularity of timing when the float valve body 4 moves upward can be restrained by making the contact area between the detection surface and the fuel G larger. However, the preset full setting point L1 does not correspond to the liquid level of the stored fuel though the detectivity improved substantially. By forming the projecting part 17 above the opening part 16 at a predetermined interval, the irregularity of the timing when the float valve body 4 moves upward can be restrained and the preset full setting point L1 can correspond to the liquid level of the stored fuel.

The distance X between the opening part 16 and the projecting part 17 and a projecting length of the projecting part 17 may be appropriately set such that the full setting point L1 corresponds to or closely approaches the liquid level of the stored fuel.

Further, the fuel tank valve 1 is installed at a position near the fuel feeding port Tc formed in the side wall section Tb of the fuel tank T on the ceiling wall section Ta of the fuel tank T. Waves of the fuel G tends to get bigger at a position near the fuel feeding port Tc. While, according to the fuel tank valve 1 of the embodiment, effects described above can be obtained even at a position where the waves of the liquid surface G1 of the fuel G are big.

The embodiment of the invention is explained above, but the invention can appropriately be changed within an object of the invention. For example, though the upper surface 16a of the hole wall in the opening part 16 is set as the full setting point, the full point is not necessarily detected but an arbitrary height point may be set to be detected.

Further, in the embodiment, the housing 2 is formed by the two members, but may be formed by a single member or three or more members. Still further, in the embodiment, though the portion of the housing 2 is arranged outside the fuel tank T, the whole housing 2 may be arranged inside the fuel tank T. Yet further, the biasing member 5 may be omitted.

What is claimed is:

1. A fuel tank valve comprising:
   a housing that is arranged in a fuel tank, is formed by a wall part in a cylindrical shape and a bottom part covering a lower end of the wall part, and includes a single hollow part;
   a single communication port that is arranged on an upper end of the housing and communicates with an outside of the fuel tank; and
   a float valve body that is installed in the housing and moves upward when fuel in the housing increases to close the communication port,
   wherein the wall part of the housing has an opening part through which the fuel flows in and out and of which an upper surface is set as a full setting point, and a projecting part that is formed to separate upward from the opening part by a predetermined distance, and projects outwardly from the wall part, a lower surface of the projecting part being substantially perpendicular to the wall part,
   the fuel flows in the housing due to differential pressure between an inside of the housing and an inside of the fuel tank so that the float valve body moves upward to close the communication port, and
   in a case where a peak of a fluctuating fuel level outside the housing contacts the lower surface of the projecting part, the float valve body closes the communication port, and in a case where the peak of the fluctuating fuel level outside the housing is below the lower surface of the projecting part, the float valve body is positioned to maintain the communication port in an open state.

2. The fuel tank valve according to claim 1, wherein the projecting part is provided in a whole circumferential direction of the housing.

3. The fuel tank valve according to claim 1, wherein the projecting part is a rectangular shape in cross section.

4. The fuel tank valve according to claim 2, wherein the projecting part is a rectangular shape in cross section.

* * * * *